United States Patent [19]

Lupinetti

[11] Patent Number: 4,905,087
[45] Date of Patent: Feb. 27, 1990

[54] UHF FM RECEIVER HAVING IMPROVED FREQUENCY STABILITY AND LOW RFI EMISSION

[75] Inventor: Francesco Lupinetti, Albuquerque, N. Mex.

[73] Assignee: The United States of American as represented by the United States Department of Energy, Washington, D.C.

[21] Appl. No.: 237,191

[22] Filed: Aug. 29, 1988

[51] Int. Cl.$^4$ .................. H04N 5/455; H04B 1/30
[52] U.S. Cl. .................. 358/191.1; 455/190; 455/205; 455/208; 455/313; 455/323
[58] Field of Search .................. 358/191.1, 188, 193.1; 455/258, 265, 260, 164, 182, 190, 205, 208, 234, 255, 257, 313, 323, 131, 324

[56] References Cited

U.S. PATENT DOCUMENTS

| | | | |
|---|---|---|---|
| 3,872,387 | 3/1975 | Banach | 358/188 |
| 4,408,351 | 10/1983 | Maurer | 455/260 |
| 4,607,392 | 8/1986 | Nolde | 455/192 |
| 4,672,636 | 6/1987 | Marshall | 455/208 |
| 4,716,464 | 12/1987 | Parker | 358/188 |
| 4,817,198 | 3/1989 | Rinderle | 455/205 |
| 4,837,853 | 6/1989 | Heck | 455/209 |

*Primary Examiner*—Tommy P. Chin
*Attorney, Agent, or Firm*—George H. Libman; James H. Chafin; William R. Moser

[57] ABSTRACT

A UHF receiver which converts UHF modulated carrier signals to baseband video signals without any heterodyne or frequency conversion stages. A bandpass filter having a fixed frequency first filters the signals. A low noise amplifier amplifies the filtered signal and applies the signal through further amplification stages to a limited FM demodulator circuit. The UHF signal is directly converted to a baseband video signal. The baseband video signal is clamped by a clamping circuit before driving a monitor. Frequency stability for the receivers is at a theoretical maximum, and interference to adjacent receivers is eliminated due to the absence of a local oscillator.

6 Claims, 5 Drawing Sheets

UHF FM RECEIVER HAVING IMPROVED FREQUENCY STABILITY AND LOW RFI EMISSION

The United States Government has rights in this invention pursuant to Contract DE-AC04-76DP00789 between the Department of Energy and AT&T Technologies, Inc.

The present invention relates to UHF receivers for demodulating video signals from a UHF carrier. Specifically, a receiver is described which does not require any frequency conversion, providing for exceptional frequency stability while minimizing RFI emissions.

Certain telemetry operations require a central receiving facility to receive information modulated on closely spaced carrier frequencies. In one such system of telemetry, a plurality of video cameras are located on diverse moving platforms which continuously monitor a visual sector. The individual video cameras are connected to telemetry transmitters operating at frequencies which are closely spaced together. These frequencies are selected to minimize the effect of motion on the mobile camera units, and advantageously lie in the UHF frequency spectrum.

In receiving the transmitted carrier signals at a central receiving location bearing the modulated television signals, a plurality of receivers are required, tuned to each of the respective carrier frequencies. Since the carrier frequencies bearing individual video signals are closely spaced together, it is important that the receivers do not radiate any local oscillator signal or intermodulation signal for interference with an adjacent carrier signal. Further, since the preferred modulation scheme is frequency modulated with a carrier deviation of ±4.2 megacycles, frequency stability is important to maintain separation between adjacent carriers in the receivers.

In order to obtain the foregoing objectives, a receiver which does not include any heterodyne circuitry for frequency shifting the incoming UHF signal is considered desirable. In this way, the RFI problem can be eliminated, and frequency stability is theoretically perfect, given the fact that no local oscillator stability problems are present.

SUMMARY OF THE INVENTION

It is an object of this invention to provide a low power, ultra-high frequency receiver.

It is a more specific object of this invention to provide direct demodulation of a video signal from a UHF signal without producing an intermediate frequency signal.

It is still another object of the invention to detect radio frequency signals transmitted by a mobile transmitter.

These and other objects of the invention are provided by a UHF receiver in accordance with the invention. The receiver provides for direct demodulation of a UHF signal to produce a video signal without the need of a local oscillator or a mixing circuit for generating an intermediate frequency signal. The receiver thus avoids unwanted radiation of a local oscillator signal which can be detected by a hostile entity or which can produce objectionable radio frequency interference to adjacent receivers at the same location.

In a preferred embodiment of the invention, the UHF signal is prefiltered with a substantially fixed frequency interdigital bandpass filter. The filter signal is applied to a low noise UHF amplifier. The amplified signal is thereafter further amplified and then applied at the carrier frequency to a limiter circuit. A limited UHF signal is demodulated at the UHF frequency without any frequency conversion steps to produce a demodulated video output signal. The wide band video signal may be appropriately DC-restored before supplying it to a video monitor.

The invention is especially suitable in those telemetry applications wherein a plurality of closely spaced carrier signals must be demodulated. The absence of any frequency conversion stages eliminates the potential RFI problem between adjacent receivers. Further, the stability of the receive frequency is maintained to a theoretical maximum.

DESCRIPTION OF THE PREFERRED EMBODIMENT

Figure 1:
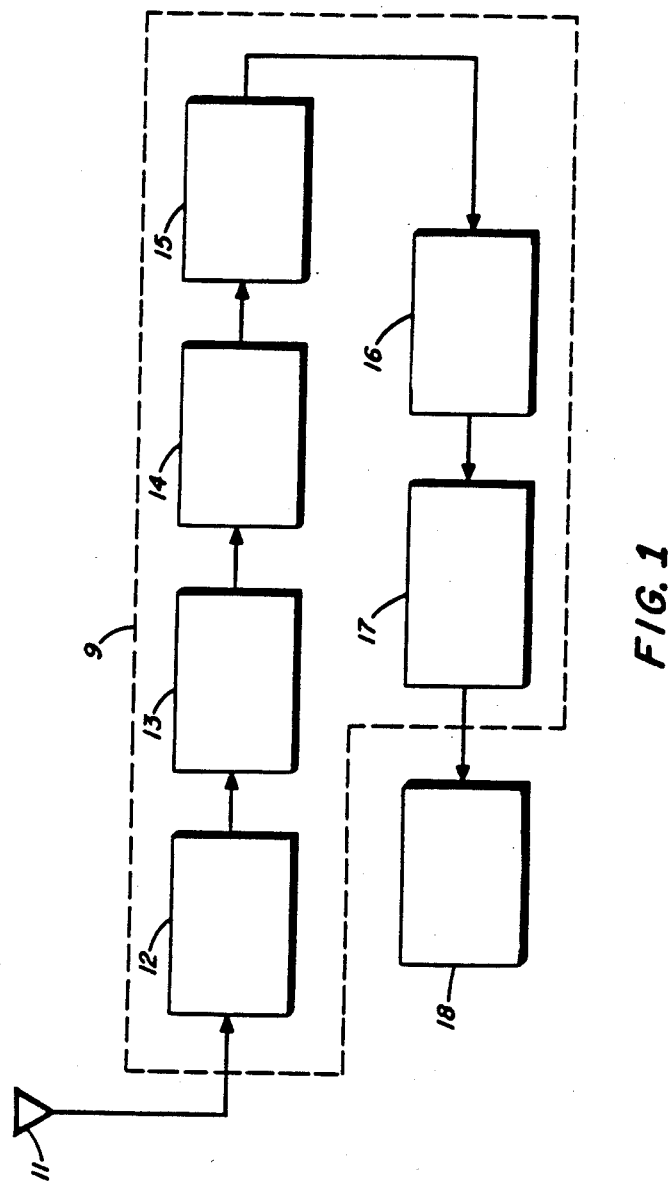
FIG. 1 illustrates a block diagram of a preferred embodiment of a UHF receiver in accordance with the invention.

Referring now to FIG. 1, there is shown a block diagram of a preferred embodiment of the invention. An antenna 11 is shown which is selected for the UHF frequency band. The UHF frequency band, in mobile applications, is less susceptible to transmission problems due to movement of a mobile transmitter with respect to a receiving facility. Further, directivity problems encountered at the higher frequencies are avoided for keeping track of mobile stations.

The antenna 11 supplies frequency modulated UHF signals to an interdigital bandpass filter 12. The UHF frequency modulated signals contain modulation components which represent a video signal in the application for which the embodiment of FIG. 1 was designed. A plurality of such carrier frequencies are used in order to transmit the video camera signal information from a plurality of mobile camera units. Each camera unit has its own carrier frequency which is deviated upwards to +or− 4.2 megacycles. It is advantageous to space the carrier signals as close as possible to efficiently use the RF spectrum.

The first preselection stage of the receiver is an interdigital bandpass filter 12. One of the carrier frequencies demodulated is at 506 MHz and is deviated +or− 4.2 MHz. The interdigital bandpass filter 12 is selected to have a 3 dB bandwidth of substantially 8.4 megacycles to accommodate the frequency modulation sidebands. Other filter types may also be used to derive other embodiments of the invention.

The filtered UHF signal is applied to a low noise UHF RF amplifier 13. It is advantageous in any telemetry receiving operation to maintain the noise added by the receiver to a minimum.

Further amplification is provided by UHF driver amplifier 14. The driver amplifier 14 will provide an amplitude level for quieting the limiter and FM video demodulator circuit 15. In order to achieve the hard limiting and effective signal to noise improvement, the amplifier 14 will provide these levels.

The limiter and FM video demodulator 15 will remove the frequency modulated video signal from the carrier signal without any intervening frequency conversion steps. Thus, the signal has suffered no frequency instability as a result of any preselection or RF conversion. The ideal, 100% frequency stability signal, is produced by a conventional limiter and FM video demodulator 15 which can be purchased to operate on an input frequency signal in the UHF band. These limiter and FM video demodulators do not include any phase locked loop or other local carrier regeneration circuitry which would otherwise provide any instabilities or modulation artifacts with which to contend.

A baseband video amplifier 16 will amplify the demodulated signal and apply the same to a baseband video clamp circuit 17. The clamp circuit 17 DC restores the video signal so that the back porch video amplitude is clamped to a known voltage level. Having once clamped the baseband video signal, and normalized its amplitude excursion, the video monitor 18 will display the video signal.

Figure 2:
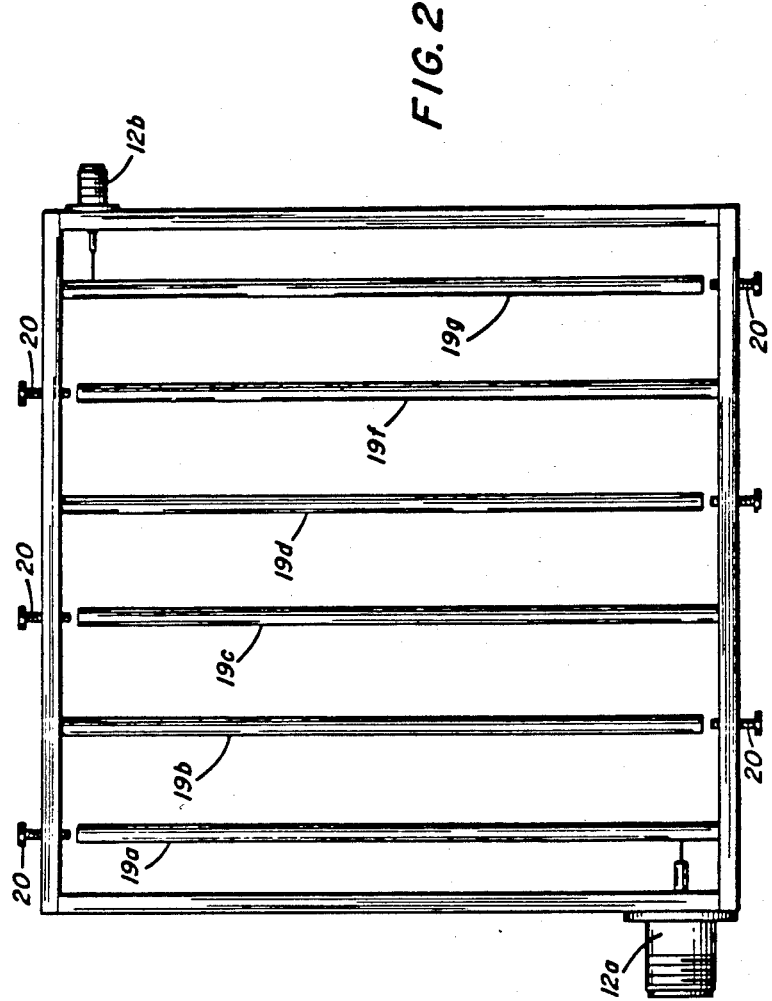
FIG. 2 illustrates the layout of an interdigital bandpass filter for use as a preselection filter in the receiver of FIG. 1.

The foregoing preferred embodiment of the invention uses an interdigital bandpass filter 12. The invention can be implemented with other filter techniques, but it has been found especially effective to use the interdigital bandpass filter shown in FIG. 2. This interdigital bandpass filter is of conventional design including at one end thereof an input connector to receive the antenna cable. The interdigital filter includes a plurality of brass rods 19a through 19g having the following dimensions:

19a: 141.648 mm
19b: 141.541 mm
19c: 141.541 mm
19d: 141.541 mm
19f: 141.541 mm
19g: 141.648 mm.

Each of these rods are situated parallel in an enclosure having a total width of 151.598 mm, and a length of 138.16 mm. A plurality of tuning screws 20 are shown for frequency aligning the bandpass filter with the carrier frequency signal.

Figure 3:
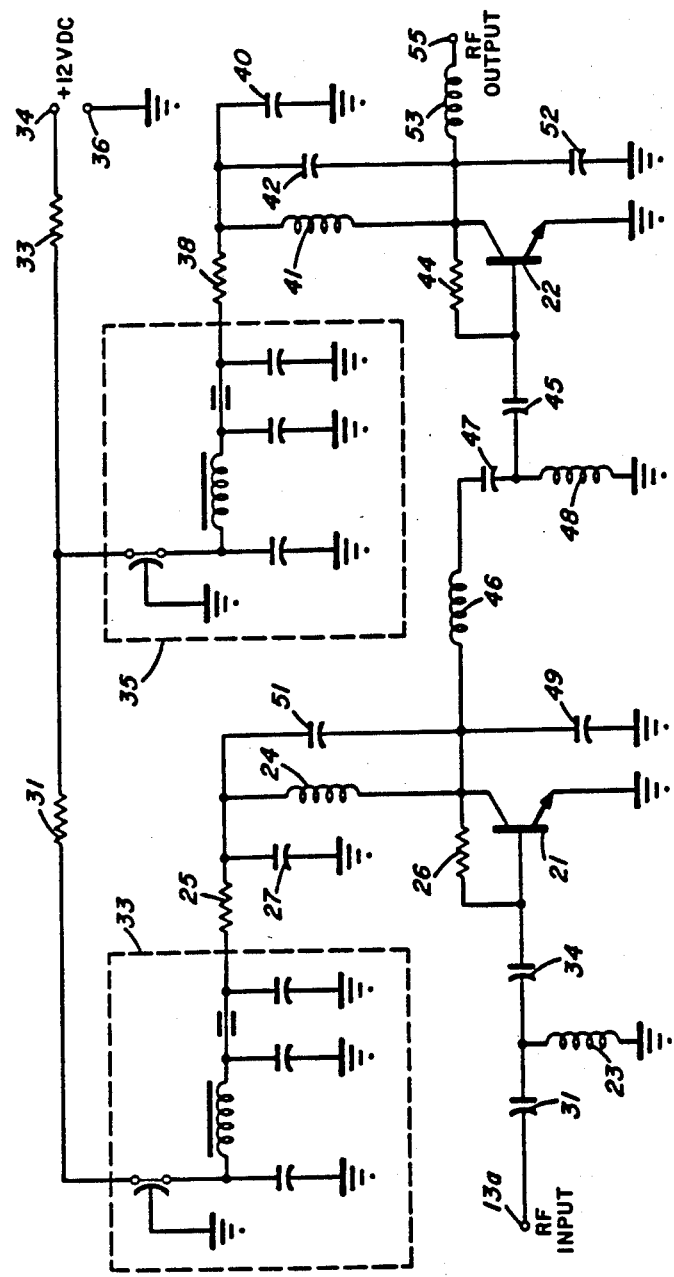
FIG. 3 illustrates the low noise UHF preamplifier used in the embodiment of FIG. 1.

The filtered UHF signal is thereafter applied to a low noise UHF RF amplifier shown more particularly in FIG. 3. FIG. 3 includes two stages of amplification provided by microwave transistors 21 and 22. The two amplification stages are coupled by a impedance matching network including capacitor 49, inductor 46, capacitor 47, inductor 48, and capacitor 45.

The first transistor stage 21 is tuned by an inductor 24 and capacitor 51. Biasing is provided to the transistor 21. Impedance matching is provided by the combination of capacitor 31, inductor 23 and capacitor 34 to the interdigital bandpass filter.

On the second amplification stage represented by transistor 22, the output signal pass band is tuned by inductor 41, and capacitor 42. A further parallel serial combination of capacitor 52 and inductor 53 will provide for impedance matching with the subsequent UHF driver amplification stage.

Biasing of each of the transistor stages 21 and 22 is provided by resistors 26 and 44. Resistors 31, 33, 25 and 38 provide additional biasing and RF isolation between the power supply terminals 34 and 36 and the amplification stages.

Figure 4:
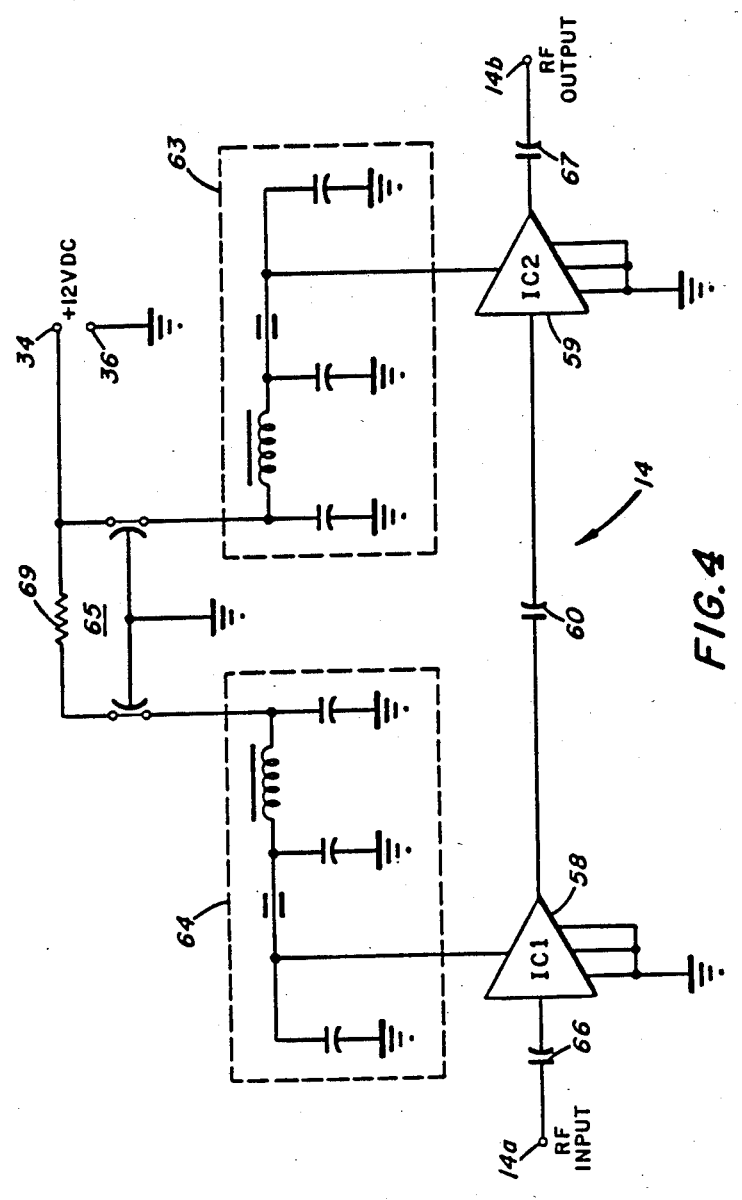
FIG. 4 illustrates further amplification stages for the derived carrier frequency signal.

Referring now to FIG. 4, there is shown a UHF RF amplifier and driver circuit 14, of FIG. 1. This driver circuit includes two hybrid amplifiers depicted as stages 58 and 59. These stages are capacitively coupled to each other via capacitor 60 and to input and output terminals 14a and 14b by capacitors 66 and 67. Decoupling circuits 63 and 64 are provided for decoupling the hybrid amplifier stages from each other, as well as from the power supply terminals 34 and 36. A pair of feed-through capacitors 65 and a resistor 69 are shown to provide further bypassing of the input DC voltage line, as well as isolation from each of the DC input lines.

Figure 5:
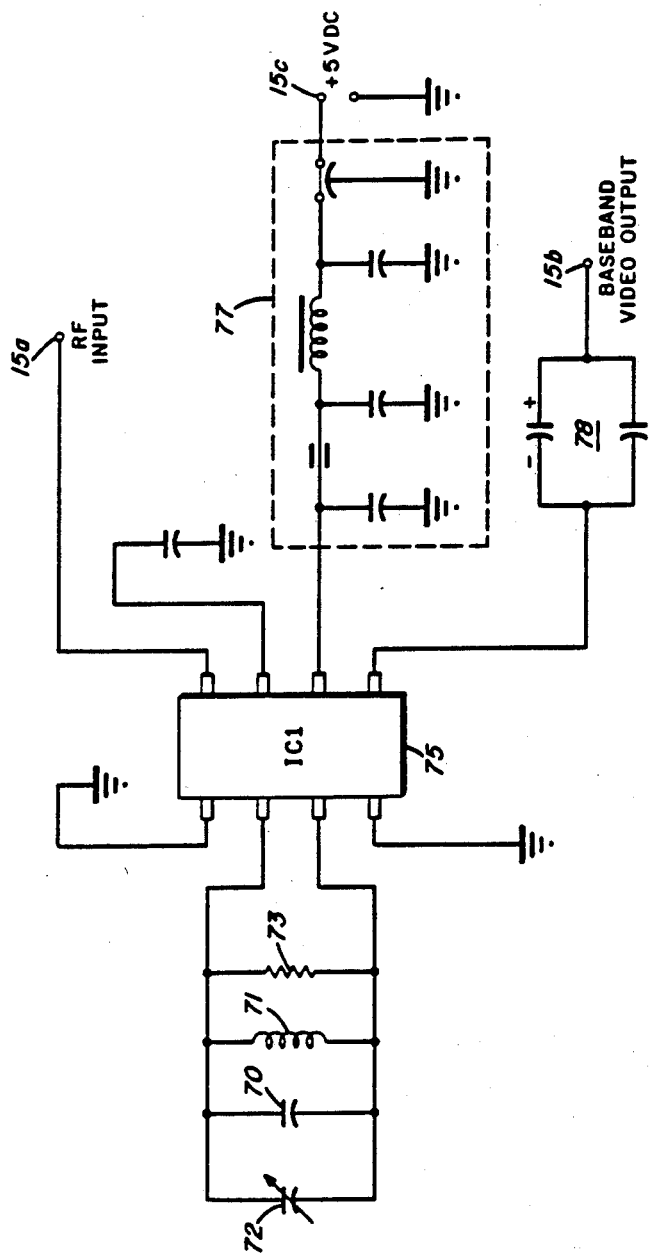
FIG. 5 shows a limiter and FM demodulator circuit for directly demodulating video on the RF carrier.

FIG. 5 illustrates the limiter and FM demodulator circuit. The limiter and FM demodulator circuit includes a quadrature circuit comprising an adjustable capacitor 72, fixed capacitor 70 and inductor 71. These components are tuned to provide the bandwidth necessary to receive the frequency modulated spectrum which accompanies the carrier signal. A resistor 73 is shown to provide the required Q for the input circuit, so that the required bandwidth may be achieved.

A limiter and video demodulator chip 75 is shown which is a commercial demodulator chip used in satellite communication for demodulating intermediate frequency signals in the UHF frequency spectrum. This demodulator circuit may be an SL1452 wide band linear FM detector. This detector includes an internal divide by four stage operating as a limiter, thus avoiding the need for an external limiter. Additionally, the circuit has an input dynamic range of 43 dB. The receiver can work linearly over that range without the need of any type of gain control circuitry. Decoupling circuitry 77 is provided for keeping any unwanted signal components from entering the DC voltage supply 15c. Coupling circuit 78 furnishes the demodulated video signal 15b to baseband video amplifier 16.

The remaining circuitry shown in FIG. 1 includes a baseband video amplifier 16 and baseband video clamp circuit and driver 17. The baseband video amplifier signal should provide approximately 37 dB of gain in order to obtain a standard 1 volt peak to peak negative baseband video signal. The output signal level from the FM video demodulator stage has an amplitude of approximately 5 mVrms.

The amplitude normalized baseband video signal is applied to a video clamp circuit and driver 17. This clamp circuit will provide DC restoration of the video signal so that the back porch portion of the video signal is clamped at a known reference level. Standard video monitors 18 require that the video signal be referenced with respect to a black reference level. The video clamp circuit and driver 17 are common in many video systems and need not further explained.

Thus, there is described an embodiment of a UHF receiver which avoids any frequency conversion stages, providing for excellent frequency stability, while avoiding the generation of any undesired local oscillator signal components which may interfere with adjacent equipment. Those skilled in the art will recognize yet other embodiments defined more particularly by the claims which follow.

What is claimed is:

1. A television receiver, for directly converting ultra high frequency (UHF) carrier signals frequency modulated with video signals to baseband video signals, comprising:

(a) a fixed frequency bandpass filter having a passband in the UHF frequency spectrums, said filter having an input connected to receive an antenna signal;

(b) a low noise UHF preamplifier connected to receive a signal from said fixed frequency bandpass filter, for amplifying said signal;

(c) a limiter circuit connected to receive a signal from said low noise UHF preamplifier; and, a video demodulator circuit connected to receive an amplitude limited UHF signal from said limiter circuit and produce, without frequency converting said UHF signal, said baseband video signal substantially free from said UHF signal.

2. The television receiver of claim 1 wherein said bandpass filter is a fixed frequency UHF bandpass filter having a 3 dB bandwidth of 8.4 MHz.

3. A television receiver, for directly converting ultra high frequency (UHF) carrier signals frequency modulated with video signals to baseband video signals, comprising:

(a) an interdigital bandpass filter having a passband in the UHF frequency spectrum, said filter having an input for receiving said UHF carrier signals, and an output;

(b) a low noise UHF preamplifier, connected to receive a signal from the output of said interdigital bandpass filter, for amplifying said signal;

(c) a limiter circuit connected to receive the amplified signal from said low noise UHF preamplifier; and (d) a video demodulator circuit, connected to receive from said limiter circuit an amplitude limited UHF signal modulated with said video signals, for producing said baseband video signal directly from said received amplitude limited UHF signal, without frequency converting said UHF signal to another frequency.

4. The television receiver of claim 3 wherein said interdigital bandpass filter has a center frequency of 506 MHz, and a 3 dB bandwidth of substantially 8.4 MHz.

5. The television receiver of claim 3 wherein said video demodulator includes a clamp circuit for restoring a proper reference level for the baseband video signal.

6. The television receiver of claim 1 wherein said filter is a fixed frequency filter having a center frequency of 506 MHz.

* * * * *